United States Patent
Bowers et al.

(10) Patent No.: US 7,120,785 B1
(45) Date of Patent: Oct. 10, 2006

(54) METHOD AND APPARATUS RENDERING USER ACCOUNTS PORTABLE

(75) Inventors: Robert T Bowers, Cupertino, CA (US); Steve Ko, San Francisco, CA (US)

(73) Assignee: Apple Computer, Inc., Cupertino, CA (US)

( * ) Notice: Subject to any disclaimer, the term of this patent is extended or adjusted under 35 U.S.C. 154(b) by 564 days.

(21) Appl. No.: 10/304,291

(22) Filed: Nov. 25, 2002

(51) Int. Cl.
  *G06F 15/177* (2006.01)
  *G06F 9/00* (2006.01)

(52) U.S. Cl. .......................................... 713/1; 713/100

(58) Field of Classification Search ...................... None
  See application file for complete search history.

(56) References Cited

U.S. PATENT DOCUMENTS

| | | | |
|---|---|---|---|
| 6,449,642 B1* | 9/2002 | Bourke-Dunphy et al. | 709/222 |
| 6,700,839 B1* | 3/2004 | Auflick et al. | 369/30.08 |
| 6,850,953 B1* | 2/2005 | Deshpande et al. | 707/103 Y |
| 2002/0180803 A1* | 12/2002 | Kaplan et al. | 345/810 |
| 2003/0174167 A1* | 9/2003 | Poo et al. | 345/752 |

OTHER PUBLICATIONS

Apple Computer, Inc. "Just Minutes Away From New Abilities," webpage, http://www.apple.com/macosx/upgrade/install.html.

* cited by examiner

*Primary Examiner*—Lynne H. Browne
*Assistant Examiner*—Stefan Stoynoy
(74) *Attorney, Agent, or Firm*—Beyer Weaver & Thomas, LLP (57) ABSTRACT

Improved approaches for enabling user accounts to be portable across different multi-user computer systems are disclosed. A user account created at a multi-user computer can be stored to an external, portable data store, thereby rendering the user account portable. The multi-user computer system, e.g., through its operating system, locates user accounts on not only in local storage of the multi-user computer system, but also in any removable data storage attached to the multi-user computer system. Hence, by coupling the external, portable data store to another multi-user computer, a user is able to login to any supporting multi-user computer and be presented with their user configuration and user directory. Since the data store that stores the user account is not only external but also portable, a user can simply tote the data store to the location of different multi-user computers. In one embodiment, the external, portable data store can not only store the user account but can also provide general data storage. In another embodiment, the external, portable data store can be a portion of a portable computing device (e.g., media player) that provides other functionality besides data storage.

17 Claims, 4 Drawing Sheets

METHOD AND APPARATUS RENDERING USER ACCOUNTS PORTABLE

BACKGROUND OF THE INVENTION

1. Field of the Invention

The present invention relates generally to multi-user computer systems and, more particularly, user account management for multi-user computer systems.

2. Description of the Related Art

Multi-user computer systems allow a single computer to support one of a number of different users. In particular, when a user desires to utilize the computer system, the computer system requires that the user login to the computer system. The login process enables the computer system to determine whether the user that is requesting to use the computer system is able to authenticate themselves as an authorized user of the computer system. If the login is successful, the user is able to use the computer system to gain access to various resources either stored locally or on a network to which the computer system is coupled as permitted by a user account. For each user account, the multi-user computer system can provide a separate environment such that different preferences, directories etc. are used for different users such that restrictions on accessing other user's personal space can be imposed.

Conventionally, a user account is stored locally within the multi-user computer and a user's personal space (e.g., user directory) for the user is also stored locally. Hence, one problem associated with such conventional approaches is that the user accounts and user directories are provided on local storage of the multi-user computer. While such provides for multi-user support, the user accounts are thus specific to the multi-user computer and stored thereon. Consequently, the user accounts are not portable. For example, a conventional operating system, such as Mac OS X, provides for multi-user support but all user accounts that are created are stored locally in a netinfo database and also have a default user directories hosted on local storage.

A few sophisticated users have modified operation of existing operating systems, such as Mac OS X, to provide some portability to their user account from a work computer to a home computer. This requires specialized software tools to manipulate and modify the data structures for a user account in a database (e.g., netinfo database). Armed with such specialized tools, a very sophisticated user would first establish a local user account on the multi-user computer (work computer), and then use the specialized tools to edit the location of the default user directory, such that it is made to reside on an external storage device. Then, at the other location where a multi-user computer (home computer) is to be used by the same user, a user account would be again established on such a machine, and then using special tools to render the user identifier the same as that which the work computer used when creating the user account at the work computer. These modifications to the multi-user computers are not intended modifications and thus tend to compromise the reliability of the operation of the multi-user computers. Further, the required specialized tools, although available, are neither well documented nor user-friendly.

Thus, there is a need for improved techniques to enable user accounts to be portable such that a user can carry their user account with them and login to any multi-user computer system that supports portable user accounts.

SUMMARY OF THE INVENTION

The invention relates to improved approaches for enabling user accounts to be portable across different multi-user computer systems. A user account can be stored to an external, portable data store, and thus the user account becomes portable. Hence, by coupling the external, portable data store to another multi-user computer system, a user is able to login to any supporting multi-user computer system and be presented with their user configuration and user directory. Since the data store that stores the user account is not only external but also portable, a user can simply tote the data store to the location of the multi-user computer system. In one embodiment, the external, portable data store is able to be coupled to the multi-user computer system for data transfer there between.

The external, portable data store can merely provide data storage or can be a portion of a portable computing device that provides other functionality besides data storage. One example of a portable computing device is a media player.

The invention can be implemented in numerous ways, including as a method, system, device, apparatus, or computer readable medium. Several embodiments of the invention are discussed below.

As a method for configuring a multi-user computer system for use by a registered user, the multi-user computer system including at least a processor, an operating system, a display device and a local data store, one embodiment of the invention includes at least the acts of: retrieving available user accounts pertaining to registered users, at least one of the available user accounts being from the local data store that is within the multi-user computer system and at least another of the available user accounts being from an external data store that is external to the multi-user computer system; presenting a representation of the retrieved available user accounts on the display device of the multi-user computer system; receiving a selection of one of the retrieved available user accounts by the registered user; authenticating the registered user as authorized for use of the selected one of the retrieved available user accounts; and configuring the multi-user computer system in accordance with the selected one of the retrieved available user accounts for use by the registered user.

As a method for establishing a portable user account for a user on a multi-user computer system, one embodiment of the invention includes at least: receiving account information for the user; producing an account record based on at least the account information; storing the account record to a portable data store, the portable data store being separate and apart from the multi-user computer system yet operatively connectable with the multi-user computer system; and creating a default folder for the user on the external data store.

As a method for establishing a user account for a user on a multi-user computer system, one embodiment includes at least the acts of: receiving account information for the user; displaying a list of available data stores on which the user account can be created, the list of available data stores including at least one internal data store and at least one external data store; receiving a selection of one of the available data stores; producing an account record based on at least the account information; and storing the account record to the selected one of the available data stores.

As a computer readable medium including at least computer program code for configuring a multi-user computer system for use by a registered user, the multi-user computer system including at least a processor, an operating system, a display device and a local data store, one embodiment of the invention includes at least: computer program code for retrieving available user accounts pertaining to registered users, at least one of the available user accounts being from the local data store that is within the multi-user computer system and at least another of the available user accounts being from a portable data store that is connectable to the multi-user computer system; computer program code for presenting a representation of the retrieved available user accounts on the display device of the multi-user computer system; computer program code for receiving a selection of one of the retrieved available user accounts by the registered user; computer program code for authenticating the registered user as authorized for use of the selected one of the retrieved available user accounts; and computer program code for configuring the multi-user computer system in accordance with the selected one of the retrieved available user accounts for use by the registered user.

As a computer readable medium including at least computer program code for establishing a portable user account for a user on a multi-user computer system, one embodiment of the invention includes at least: computer program code for receiving account information for the user; computer program code for producing an account record based on at least the account information; computer program code for storing the account record to a portable data store, the portable data store being separate and apart from the multi-user computer system yet operatively connectable with the multi-user computer system; and computer program code for creating a default folder for the user on the external data store.

As a computer readable medium including at least computer program code for establishing a user account for a user on a multi-user computer system, one embodiment of the invention includes at least: computer program code for receiving account information for the user; computer program code for displaying a list of available data stores on which the user account can be created, the list of available data stores including at least one local data store and at least one portable data store; computer program code for receiving a selection of one of the available data stores; computer program code for producing an account record based on at least the account information; and computer program code for storing the account record to the selected one of the available data stores.

As a multi-user computer system, one embodiment of the invention includes at least an external data storage device and a multi-user computer. The external data storage device is removable from the multi-user computer and portable. The multi-user computer has an operating system that includes at least an account creation module and a login module. The account creation module permits new user accounts to be created and stored to the external storage device. The login module permits login with respect to users having their user accounts stored to the external data storage device.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The invention relates to improved approaches for enabling user accounts to be portable across different multi-user computer systems. A user account created at a multi-user computer can be stored to an external, portable data store, and thus the user account becomes portable. The multi-user computer system, e.g., through its operating system, locates user accounts on not only in local storage of the multi-user computer system, but also in any removable data storage attached to the multi-user computer system. Hence, by coupling the external, portable data store to another multi-user computer, a user is able to login to any supporting multi-user computer and be presented with their user configuration and user directory. Since the data store that stores the user account is not only external but also portable, a user can simply tote the data store to the location of different multi-user computers. In one embodiment, the external, portable data store can not only store the user account but can also provide general data storage.

The external, portable data store can merely provide data storage or can be a portion of a portable computing device that provides other functionality besides data storage. One example of a portable computing device is a media player.

Embodiments of the invention are discussed below with reference to FIGS. 1–4. However, those skilled in the art will readily appreciate that the detailed description given herein with respect to these figures is for explanatory purposes as the invention extends beyond these limited embodiments.

Figure 1:
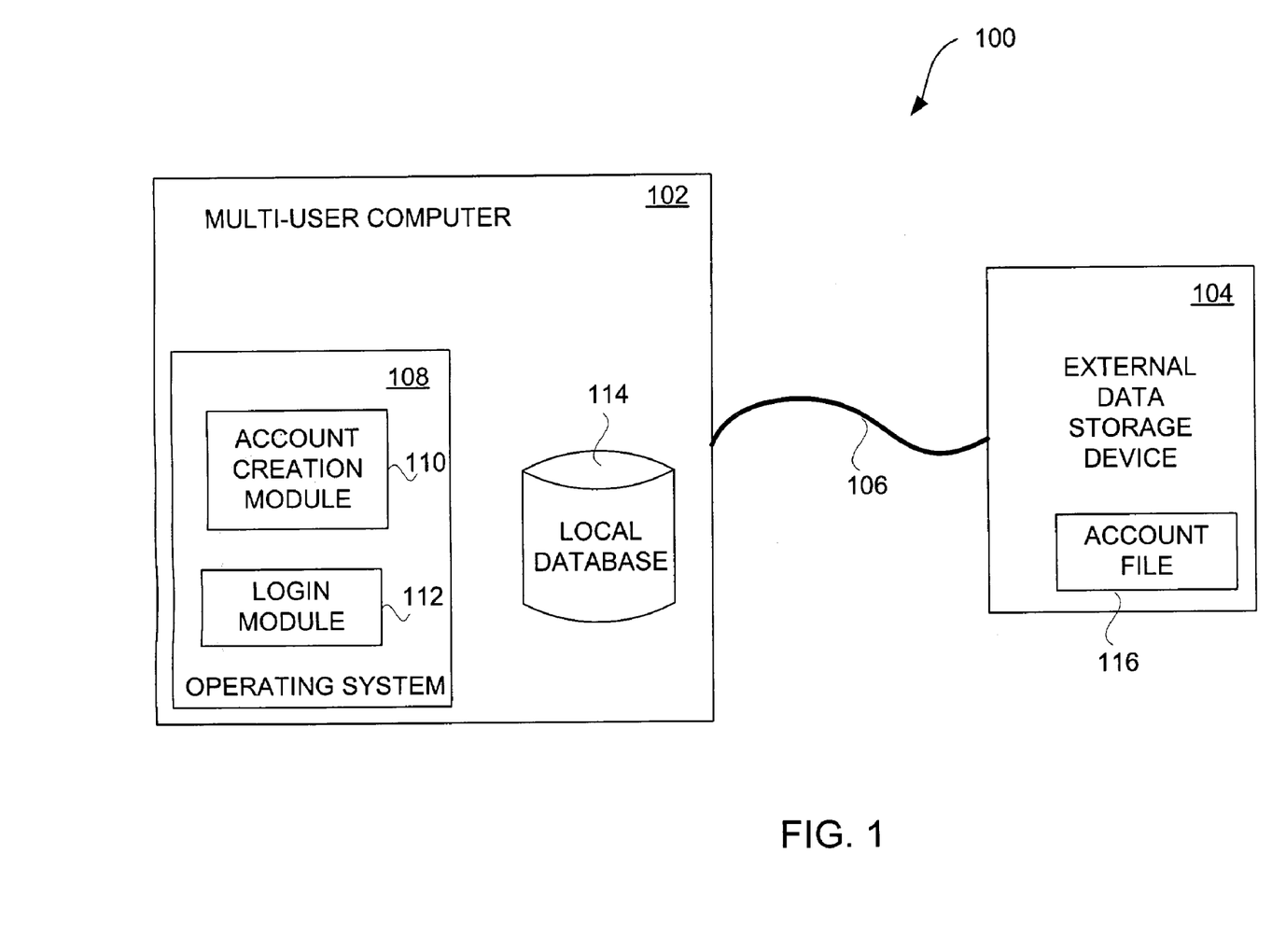
FIG. 1 is a simplified block diagram of a multi-user computer system according to one embodiment of the invention.

FIG. 1 is a simplified block diagram of a multi-user computer system 100 according to one embodiment of the invention. The multi-user computer system 100 includes a multi-user computer 102 and an external data storage device 104. The external data storage device 104 is typically a portable storage device that can couple to the local computer 102 over a temporary link 106. The temporary link 106 can be a peripheral bus (e.g., FIREWIRE, Universal Serial Bus (USB)). A cable can be used to provide the electrical connections for the temporary link 106. Although not specifically illustrated in FIG. 1, the multi-user computer 102 includes conventional hardware associated with a computer, namely, a microprocessor, semiconductor memory storage, peripheral bus controller, peripheral ports, disk drives, display device, etc. As the simplified illustration in FIG. 1 indicates, the multi-user computer 102 also includes an operating system 108. The operating system is typically executed by the microprocessor to control basic operations of the multi-user computer 102. The operating system 108, besides various conventional modules, includes an account creation module 110 and a login module 112. The account creation module 110 allows users to create accounts for use of the multi-user computer 102. According to the invention, these user accounts can reside either internal to (or within)

the multi-user computer 102 or external to the multi-user computer 102. In one embodiment, the internal (or local) user accounts reside within a local database 114 hosted by the multi-user computer 102. In one embodiment, the external user accounts reside on the external data storage device 106, such as within an account file 116. The login module 112 allows a user to log into any of the previously created user accounts, regardless of whether such accounts are stored locally within the multi-user computer 102 (e.g., stored within the local database 114) or externally in the external data storage device 104 (e.g., stored in the account file 116).

The external data storage device 104 provides portable data storage. That is, the external data storage device 104 is highly portable and able to be temporarily connected to different multi-user computers. Examples of external data storage devices include: portable data storage device, media player with data storage, and data storage drive (e.g., FIREWIRE drive). The term "media player" generally refers to computing devices that are dedicated to processing media such as audio, video or other images. Hence, the external data storage device 104 can be contained within a device that provides additional functions or capabilities beyond data storage. Often the external data storage device 104 is handheld (or pocket-sized) or smaller to increase its portability. Although the external data storage device is noted as being external to the multi-user computer, the external data storage device can, in certain embodiments, plug into a socket, port or bay of the multi-user computer.

Figure 2:
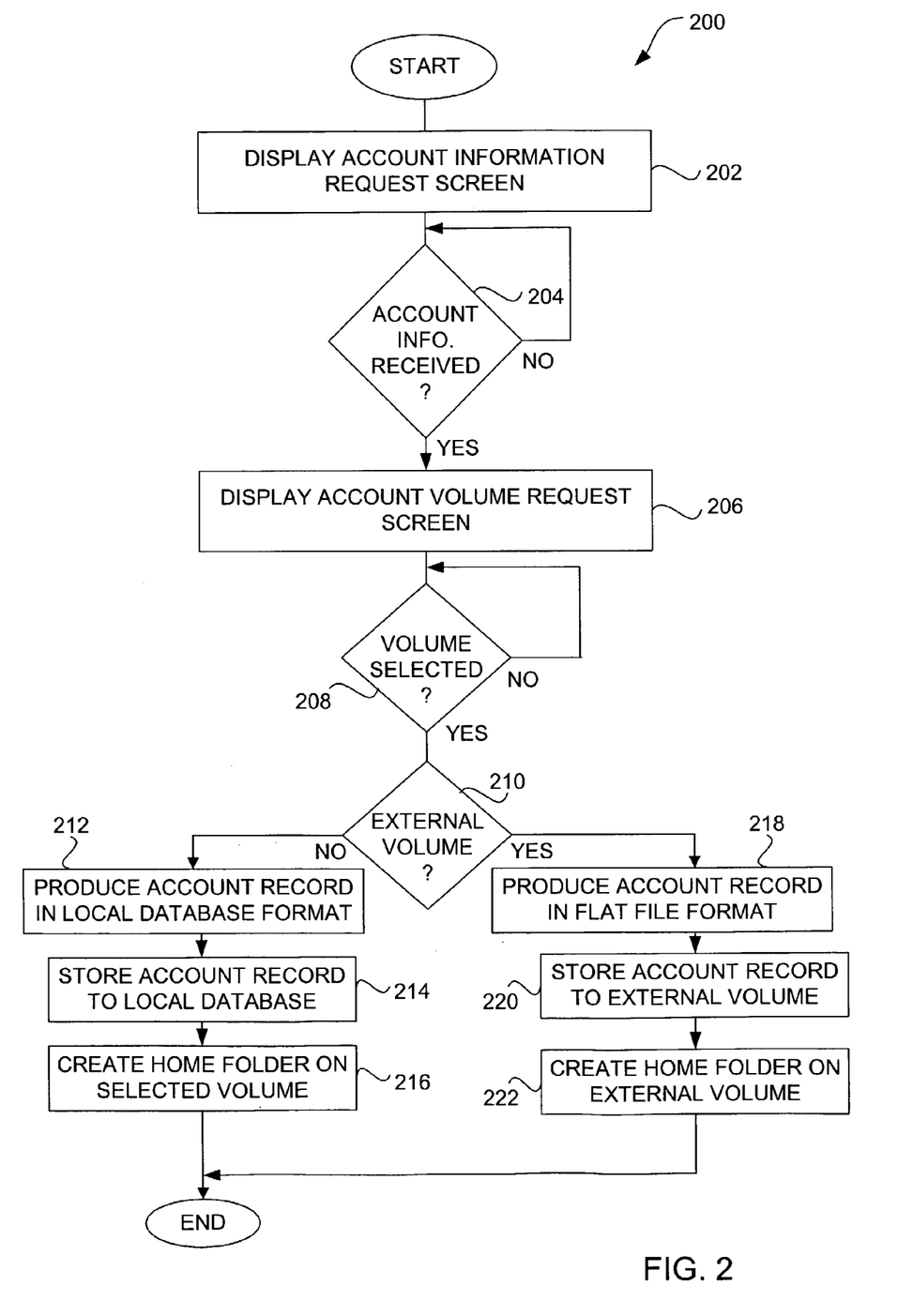
FIG. 2 is a flow diagram of user account creation processing according to one embodiment of the invention.

FIG. 2 is a flow diagram of user account creation processing 200 according to one embodiment of the invention. The user account creation processing 200 operates to create a new account for a user with respect to a multi-user computer system. Hence, the user account creation processing 200 is invoked when a new user account is to be created.

Once invoked, the user account creation processing 200 displays 202 an account information request screen. The account information request screen requests that the user enter information for the account that they wish to establish with respect to the multi-user computer system. The account information that might be requested from the user can include a user name, a password, password hint, and one or more user preferences (e.g., picture, background, etc.). A decision 204 then determines whether the account information has been received. In other words, once the account information request screen is displayed 202, the user is requested to provide the account information by completing the entries of the account information request screen and then submitting the information. Hence, the decision 204 determines whether the user has completed the account information screen and submitted the requested information. When the decision 204 determines that the account information has not been received, then the user account creation processing 200 awaits receipt of the account information.

On the other hand, once the decision 204 determines that the account information has been received, then the user account creation processing 200 continues. Namely, an account volume request screen is then displayed 206. In one embodiment, the account volume request screen displays a list of available volumes associated with the multi-user computer system. The volumes pertain to regions of data storage devices (e.g., disk drives). The volumes are often associated with different data storage devices. The available account volumes include not only local volumes that are internal to the multi-user computer system but also external volumes that are remote with respect to the multi-user computer system. Since the external volumes are remote from the multi-user computer system, the external volumes are able to be coupled to the multi-user computer system, such as through a peripheral bus. The external volumes can also be considered to be hosted by portable data storage devices. Examples of portable data storage devices include external disk drives and external media devices that provide data storage.

Next, a decision 208 determines whether a volume has been selected. Here, the decision 208, in accordance with one embodiment, can determine whether one of the available volumes that has been displayed by the account volume request screen has been selected. When the decision 208 determines that a volume has not yet been selected, the user account creation processing 200 awaits such a selection.

Alternatively, when the decision 208 determines that a volume has been selected, then a decision 210 determines whether the selected volume is an external volume. When the decision 210 determines that the selected volume is not an external volume, the selected volume is thus an internal volume.

When the selected volume is an internal volume, the user account creation processing 200 produces 212 an account record in a local database format. The account record includes the account information or a portion thereof that has been provided by the user together with other account information generated by the system. For example, the account record might include a user name, a password (in an encrypted format), a user identifier, a password hint, at least one user preference (e.g., a user picture), and a home directory (default directory). The user identifier and the home directory are system-provided. After the account record has been produced 212, the account record is stored 214 to a local database. The local database is provided within the multi-user computer system and serves to store account data for one or more users associated with the multi-user computer system. Further, a home folder is created 216 on the selected volume. Often, the selected volume is a base volume. The base volume is an internal volume for the multi-user computer system. In one embodiment, the base volume is a boot volume that is utilized by the multi-user computer system when booting up.

On the other hand, when the decision 210 determines that the selected volume is an external volume, then an account record is produced 218 in a flat file format. The account record is then stored 220 to the external volume (which is the selected volume). Further, a home folder is created 222 on the external volume.

Hence, following the operation 216, the new user account has been created on an internal volume of the multi-user computer system, and following the operation 222, the new user account is created on the external volume that is separate and apart from the multi-user computer system (though capable of coupling thereto). In any case, following either the operation 216 or the operation 222, the user account creation processing 200 is complete and ends.

In one embodiment, the account record with the flat file format is a markup language document that contains name-value pairs for the account information. As an example, such a markup language document can be a eXtensible Markup Language (XML) document. In one embodiment, the local database that stores account information can be a netinfo database as used by Mac OS X from Apple Computer, Inc.

Figure 3:
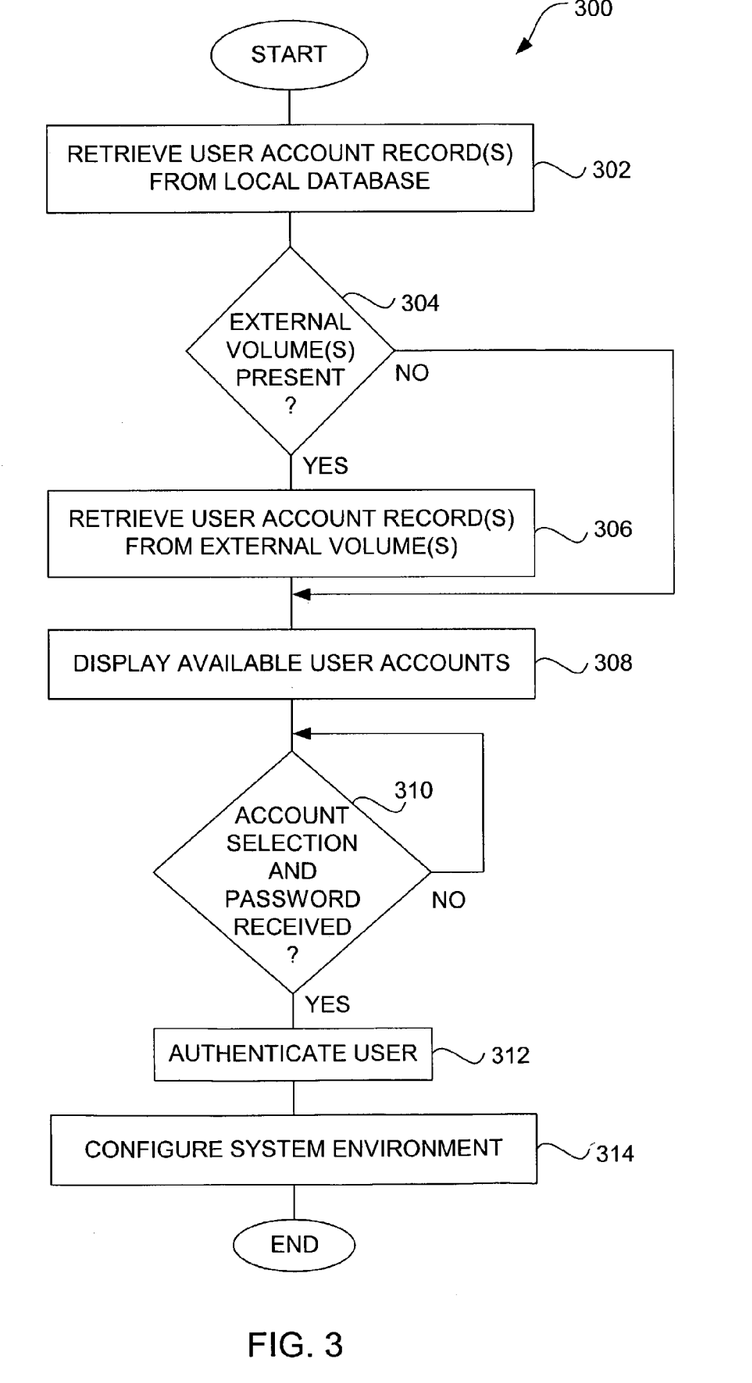
FIG. 3 is a flow diagram of user login processing according to one embodiment of the invention.

FIG. 3 is a flow diagram of user login processing 300 according to one embodiment of the invention. The user login processing 300 is performed when a user of a multi-user computer system attempts to log into the system to gain access to resources provided therein. In general, for a user to log into the system, the user must have a user account with the system. As an example, a user account can be created with the system using the user account creation processing 200 discussed above with respect to FIG. 2.

In any case, the user login processing 300 initially retrieves 302 user account records from a local database. Each user account record pertains to a different user of the system. In one embodiment the local database is provided within the multi-user computer system and stores account records for one or more users. These account records, however, pertain only to those user accounts that utilize an internal volume for storage of the account records.

Following the retrieval 302 of the user account records from the local database, a decision 304 determines whether one or more external volumes are accessible to the multi-user computer system. As noted above with respect to FIG. 2, user account records can be stored on external volumes so as to provide portability of such user accounts. Hence, the decision 304 determines whether any external volumes are present. When the decision 304 determines that one or more external volumes are present, then user account records are retrieved 306 from the one or more external volumes. Here, the external volumes are typically portable or removable with respect to the multi-user computer system; hence, in order to retrieve user account records from an external volume, the external volume must be operatively connected to the multi-user computer system. Typically, a cable or other link is utilized to connect a storage device hosting the external volume to the multi-user computer system. In one embodiment, the link is a peripheral bus, such as a FIREWIRE bus or a Universal Serial Bus (USB) provided over a cable. Alternatively, when the decision 304 determines that there are no external volumes present, then the operation 306 is bypassed.

Following the operation 306 or its being bypassed, available user accounts are then displayed 308. The available user accounts include those user accounts retrieved from internal volumes as well as those user accounts retrieved from external volumes. By displaying 308 all of the available user accounts, the user is given the option of selecting any one of the available user accounts to be utilized during a login. In one embodiment, those available user accounts that are stored to external volumes are distinguishably displayed from those of the user accounts that are from internal volumes. As an example, available user accounts from external volumes can be displayed such that each has an additional icon displayed proximate thereto. However, various other ways can be utilized to distinguishably display those of the available user accounts that are from external volumes.

Next, a decision 310 determines whether an account selection and a password have been received. The account selection is a selection of one of the available user accounts being displayed 308. When the decision 310 determines that an account selection and password have not yet been received, the user login processing 300 can await such information. Here, in order to enable the user to log into the multi-user computer system, the user must select one of the available user accounts and provide at least a password in order to gain access to that user account. Often, a user name is also needed for the user to gain access to a user account. When the decision 310 determines that an account selection and a password have not yet been received, then the user login processing 300 awaits such information. Once the decision 310 determines that one of the available user accounts has been selected and a password (and perhaps user name) for entry into that user account have been received, then the user is authenticated 312. Here, the user is authenticated typically by at least the password and often by both the password and user name. When the multi-user computer system determines that the user is authenticated through use of the password and/or user name, then the user is deemed authenticated 312. In the event that the user is not authenticated, then the user login processing 300 would deny the user access to the selected user account. However, as illustrated in FIG. 3, after the user has been authenticated 312 (which is assumed to be successful), a system environment for the multi-user computer system is configured 314. The configuration of the system environment can, for example, set a user identifier to that value associated with the selected user account, set the user's preferences, and establish the user directory (home directory). Hence, the system environment is dependent on the selected user account that a user has successfully logged into.

Figure 4:
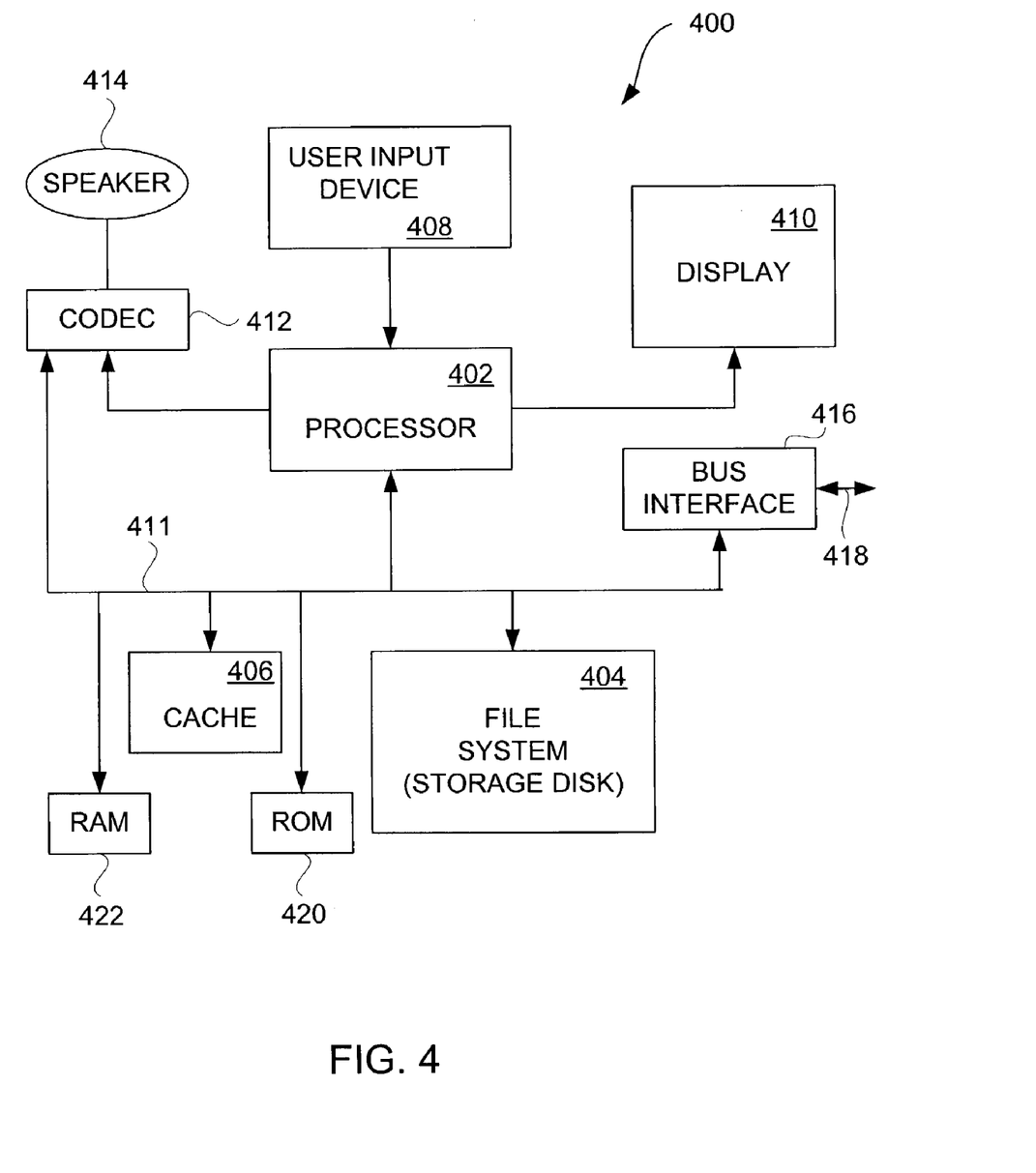
FIG. 4 is a block diagram of a representative media player suitable for use as an external data store in accordance with one embodiment.

As noted above, the external data store can be a portable media player having data storage capabilities. FIG. 4 is a block diagram of a representative media player 400 suitable for use as an external data store in accordance with one embodiment. The media player 400 includes a processor 402 that pertains to a microprocessor or controller for controlling the overall operation of the media player 400. The media player 400 stores media data pertaining to media items in a file system 404 and a cache 406. The file system 404 is typically a storage disk or a plurality of disks. The file system 404 typically provides high capacity storage capability for the media player 400. However, since the access time to the file system 404 is relatively slow, the media player 400 can also include a cache 406. The cache 406 is, for example, Random-Access Memory (RAM) provided by semiconductor memory. The relative access time to the cache 406 is substantially shorter than for the file system 404. However, the cache 406 does not have the large storage capacity of the file system 404. Further, the file system 404, when active, consumes more power than does the cache 406. The power consumption is particularly important when the media player 400 is a portable media player that is powered by a battery (not shown). The file system 404 can also store one or more user accounts (portable user accounts) and store user folders, directories or files. In general, the file system 404 acts as a data store. In one embodiment, the file system 404 is provided by a disk drive. The media player 400 also includes a RAM 420 and a Read-Only Memory (ROM) 422. The ROM 422 can store programs, utilities or processes to be executed in a non-volatile manner. The RAM 420 provides volatile data storage, such as for the cache 406.

The media player 400 also includes a user input device 408 that allows a user of the media player 400 to interact with the media player 400. For example, the user input device 408 can take a variety of forms, such as a button, keypad, dial, etc. Still further, the media player 400 includes a display 410 (screen display) that can be controlled by the processor 402 to display information to the user. A data bus 411 can facilitate data transfer between at least the file system 404, the cache 406, the processor 402, and the CODEC 412.

In one embodiment, the media player 400 serves to store a plurality of media items (e.g., songs) in the file system 404. When a user desires to have the media player play a particular media item, a list of available media items is displayed on the display 410. Then, using the user input device 408, a user can select one of the available media items. The processor 402, upon receiving a selection of a particular media item, supplies the media data (e.g., audio file) for the particular media item to a coder/decoder (CO- DEC) 412. The CODEC 412 then produces analog output signals for a speaker 414. The speaker 414 can be a speaker internal to the media player 400 or external to the media player 400. For example, headphones or earphones that connect to the media player 400 would be considered an external speaker.

The media player 400 also includes a bus interface 416 that couples to a data link 418. The data link 418 allows the media player 400 to couple to a host computer. In one embodiment, the data link 418 pertains to a FIREWIRE bus or a Universal Serial Bus (USB).

The various aspects or features of the invention described above can be used alone or in various combinations. The invention is preferably implemented by a combination of hardware and software, but can also be implemented in either hardware or software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. It should be noted that this is not an exhaustive list and there may be other advantages which are not described herein. One advantage of the invention is that a user is able to carry an external storage device to any multi-user computer system that supports the external storage device and then log into to the system in an ordinary manner to gain access to general and user-specific resources as if it were the user's personal system. Another advantage of the invention is that user accounts for multi-user computer systems can be stored on external storage devices. Still another advantage of the invention is that external storage devices can serve other purposes besides user account storage and/or be part of devices having additional functions and capabilities.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for configuring a multi-user computer system for use by a registered user, the multi-user computer system including at least a processor, an operating system, a display device and a local data store, said method comprising:

retrieving available user accounts pertaining to registered users, at least one of the available user accounts being from the local data store that is within the multi-user computer system and at least another of the available user accounts being from an external data store that is external to the multi-user computer system;

presenting a representation of the retrieved available user accounts on the display device of the multi-user computer system;

receiving a selection of one of the retrieved available user accounts by the registered user;

authenticating the registered user as authorized for use of the selected one of the retrieved available user accounts; and configuring the multi-user computer system in accordance with the selected one of the retrieved available user accounts for use by the registered user.

2. A method as recited in claim 1, wherein said presenting comprises displaying a representation for each of the retrieved available user accounts on the display device of the multi-user computer system.

3. A method as recited in claim 2, wherein said displaying operates to distinguishably display the representation for the at least one of the available user accounts being from an external data store from the representation for the at least one of the available user accounts being from the local data store.

4. A method as recited in claim 2, wherein the representation for the at least one of the available user accounts being from the external data store comprises an icon, the icon distinguishably displays the representation for the at least one of the available user accounts being from the external data store from the at least one of the available user accounts being from the local data store.

5. A method as recited in claim 2, wherein the representation for the at least one of the available user accounts being from an external data store is displayed graphically distinct from the representation for the at least one of the available user accounts being from the local data store.

6. A method as recited in claim 1, wherein the external data store is a peripheral storage device that is separate and apart from the multi-user computer system.

7. A method as recited in claim 6, wherein the peripheral storage device comprises a disk storage medium.

8. A method as recited in claim 6, wherein the peripheral storage device is within a portable media player.

9. A method as recited in claim 1, wherein the external data store couples to the multi-user computer system over a peripheral link that couples the external data store to the multi-user computer system.

10. A method as recited in claim 9, wherein the peripheral link is supported by a detachable cable that couples the external data store to the multi-user computer system.

11. A method as recited in claim 10, wherein the peripheral link is a FIREWIRE bus, and wherein the detachable cable is a FIREWIRE cable.

12. A method as recited in claim 9, wherein the peripheral storage device comprises a disk storage medium.

13. A method as recited in claim 9, wherein the peripheral storage device is within a portable media player.

14. A method as recited in claim 1, wherein the account information including at least a user name and a password.

15. A method as recited in claim 1, wherein said retrieving the available user accounts comprises:

retrieving the at least one of the available user accounts from the local data store in a first format; and retrieving the at least another of the available user accounts from the external data store in a second format, the second format being different than the first format.

16. A method as recited in claim 15, wherein the first format pertains to a database stored on the local data store, and wherein the second format pertains to a flat file format stored to the external data store.

17. A data storage device including at least computer program code for configuring a multi-user computer system for use by a registered user, the multi-user computer system including at least a processor, an operating system, a display device and a local data store, said computer readable medium comprising:

computer program code for retrieving available user accounts pertaining to registered users, at least one of the available user accounts being from the local data store that is within the multi-user computer system and at least another of the available user accounts being from a portable data store that is connectable to the multi-user computer system;

computer program code for presenting a representation of the retrieved available user accounts on the display device of the multi-user computer system;

computer program code for receiving a selection of one of the retrieved available user accounts by the registered user;

computer program code for authenticating the registered user as authorized for use of the selected one of the retrieved available user accounts; and computer program code for configuring the multi-user computer system in accordance with the selected one of the retrieved available user accounts for use by the registered user.

* * * * *